(12) United States Patent
Banerjee et al.

(10) Patent No.: US 7,454,456 B2
(45) Date of Patent: Nov. 18, 2008

(54) APPARATUS AND METHOD OF IMPROVING NETWORK PERFORMANCE USING VIRTUAL INTERFACES

(75) Inventors: Dwip N. Banerjee, Austin, TX (US); Herman Dietrich Dierks, Jr., Round Rock, TX (US); Vinit Jain, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1200 days.

(21) Appl. No.: 10/076,357

(22) Filed: Feb. 14, 2002

(65) Prior Publication Data

US 2003/0154313 A1 Aug. 14, 2003

(51) Int. Cl.
*G06F 15/16* (2006.01)
(52) U.S. Cl. .................. 709/201; 709/238; 709/242; 709/243
(58) Field of Classification Search .......... 709/200, 709/213, 400, 201, 238, 242–243; 711/200, 711/206–208
See application file for complete search history.

(56) References Cited

U.S. PATENT DOCUMENTS

| | | | | |
|---|---|---|---|---|
| 5,978,894 A * | 11/1999 | Sukegawa et al. | ........... | 711/203 |
| 6,049,853 A * | 4/2000 | Kingsbury et al. | .......... | 711/147 |
| 6,049,857 A * | 4/2000 | Watkins | ....................... | 711/207 |
| 6,105,110 A * | 8/2000 | Watkins | ....................... | 711/135 |
| 6,304,951 B1 * | 10/2001 | Mealey et al. | ................ | 711/206 |
| 6,397,316 B2 * | 5/2002 | Fesas, Jr. | ..................... | 711/200 |
| 6,505,269 B1 * | 1/2003 | Potter | ......................... | 711/202 |
| 6,629,166 B1 * | 9/2003 | Grun | ........................... | 710/36 |
| 6,631,422 B1 * | 10/2003 | Althaus et al. | .............. | 709/250 |
| 6,725,284 B2 * | 4/2004 | Arndt | ............................ | 710/5 |
| 6,735,773 B1 * | 5/2004 | Trinh et al. | ................. | 719/328 |
| 6,779,036 B1 * | 8/2004 | Deshpande | ................. | 709/232 |
| 6,799,200 B1 * | 9/2004 | Blackmore et al. | .......... | 709/212 |
| 6,871,219 B2 * | 3/2005 | Noordergraaf et al. | ...... | 709/214 |
| 6,874,076 B2 * | 3/2005 | Rogers et al. | .............. | 711/207 |
| 6,880,062 B1 * | 4/2005 | Ibrahim et al. | .............. | 711/202 |
| 6,898,643 B2 * | 5/2005 | Joyeau et al. | .................. | 710/3 |
| 6,898,670 B2 * | 5/2005 | Nahum | ........................ | 709/212 |
| 6,934,799 B2 * | 8/2005 | Acharya et al. | ............. | 711/112 |
| 6,947,970 B2 * | 9/2005 | Berry | .......................... | 709/212 |
| 6,976,083 B1 * | 12/2005 | Baskey et al. | ................ | 709/232 |
| 2001/0023456 A1 * | 9/2001 | Nakashima | ................. | 709/242 |
| 2002/0156613 A1 * | 10/2002 | Geng et al. | .................... | 703/23 |

* cited by examiner

*Primary Examiner*—Bunjob Jaroenchonwanit
*Assistant Examiner*—Van Kim T Nguyen
(74) *Attorney, Agent, or Firm*—Votel Emile; Libby Z. Handelsman; Mark E. McBurney (57) ABSTRACT

A method, system and apparatus for improving network performance of a multiprocessor system that has a limited number of physical network interfaces by using virtual IP addresses are provided. When a processor of the multiprocessor system determines that it is processing network data, it uses a virtual IP address to transmit the data. The virtual IP address is associated with a buffer; and thus the data is sent to the buffer. This allows the processor to be free to process other data, network or otherwise. The buffer, with the help of a controller, then contends for the use of one of the limited physical network interfaces to transmit the data.

20 Claims, 9 Drawing Sheets

| BUFFER | VIRTUAL IP ADDRESS | STATUS | PROCESSOR | DESTINATION IP ADDRESS |
|---|---|---|---|---|
| $BUFFER_1$ | $IP\ ADDRESS_1$ | IN USE | $P_1$ | $IP\ ADDRESS_1$ |
| $BUFFER_2$ | $IP\ ADDRESS_2$ | NOT IN USE | | |
| $BUFFER_3$ | $IP\ ADDRESS_3$ | NOT IN USE | | |
| ... | ... | ... | ... | ... |
| $BUFFER_N$ | $IP\ ADDRESS_N$ | IN USE | $P_4$ | $IP\ ADDRESS_2$ |

APPARATUS AND METHOD OF IMPROVING NETWORK PERFORMANCE USING VIRTUAL INTERFACES

BACKGROUND OF THE INVENTION

1. Technical Field

The present invention is directed to communications networks. More specifically, the present invention is directed to a method and apparatus for improving network performance of a multiprocessor system using virtual interfaces.

2. Description of Related Art

Most servers are multiprocessor systems. As the name suggests, a multiprocessor system has multiple processors. The processors often process data in parallel and hence, enhance performance of the computer systems within which they are embedded. Furthermore, a multiprocessor system has increased reliability since the failure of one processor will not necessarily lead to a crash of the entire system.

The multiprocessor systems are often connected to a network or networks through a limited number (usually one) of physical interfaces. Consequently, before a processor in a multiprocessor system uses a physical interface to transmit network data, it has to first request permission to lock out all the other processors from using the interface. If more than one processor is requesting access to the interface, there may be some access contention or lock contention. To reduce the likelihood of lock contention, an algorithm is generally used to select which one of the requests to honor first. The algorithm may do so on a first-come, first serve or round robin or on a priority basis or using any other contention resolution scheme.

In any case, when an access request is honored, the requesting processor is allowed to lock out all other processors from using the interface until the data is transmitted. When the processor has finished transmitting the data, it releases the lock to allow another processor to gain access to the lock. Obviously, while the processor is transmitting data, other processors may issue requests to the lock. Hence, there may be instances when other processors have to wait before gaining access to the network interface in order to transmit data. In these instances, the physical interface may be viewed as a bottleneck as requests for the physical interface are accumulating at that point.

Thus, although the use of a multiprocessor in a system may greatly improve a computer system's performance, network communications performance may nonetheless not benefit from the use of the multiple processors due to this bottleneck.

Therefore, it would be desirable to have a method and apparatus that alleviates bottlenecks at the physical interface in the point of view of the processors.

SUMMARY OF THE INVENTION

The present invention provides a method, system and apparatus for improving network performance of a multiprocessor system that has a limited number of physical network interfaces by using virtual IP addresses. When a processor of the multiprocessor system determines that it is processing network data, it uses a virtual IP address to transmit the data. The virtual IP address is associated with a buffer; and thus the data is sent to the buffer. This allows the processor to be free to process other data, network or otherwise. The buffer, with the help of a controller, then contends for the use of one of the limited physical network interfaces to transmit the data.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
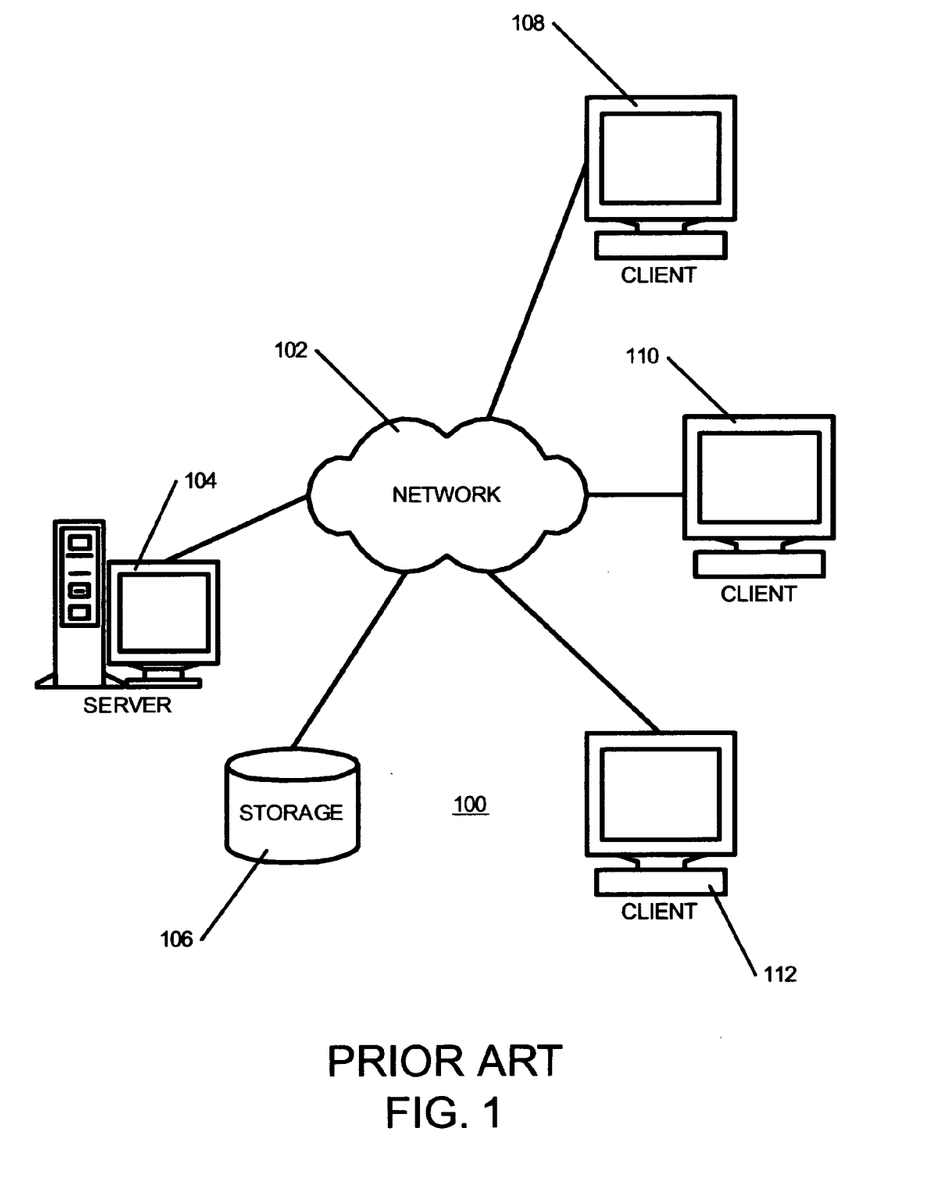
FIG. 1 is an exemplary block diagram illustrating a distributed data processing system according to the present invention.

With reference now to the figures, FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, server 104 is connected to network 102 along with storage unit 106. In addition, clients 108, 110, and 112 are connected to network 102. These clients 108, 110, and 112 may be, for example, personal computers or network computers. In the depicted example, server 104 provides data, such as boot files, operating system images, and applications to clients 108, 110 and 112. Clients 108, 110 and 112 are clients to server 104. Network data processing system 100 may include additional servers, clients, and other devices not shown. In the depicted example, network data processing system 100 is the Internet with network 102 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
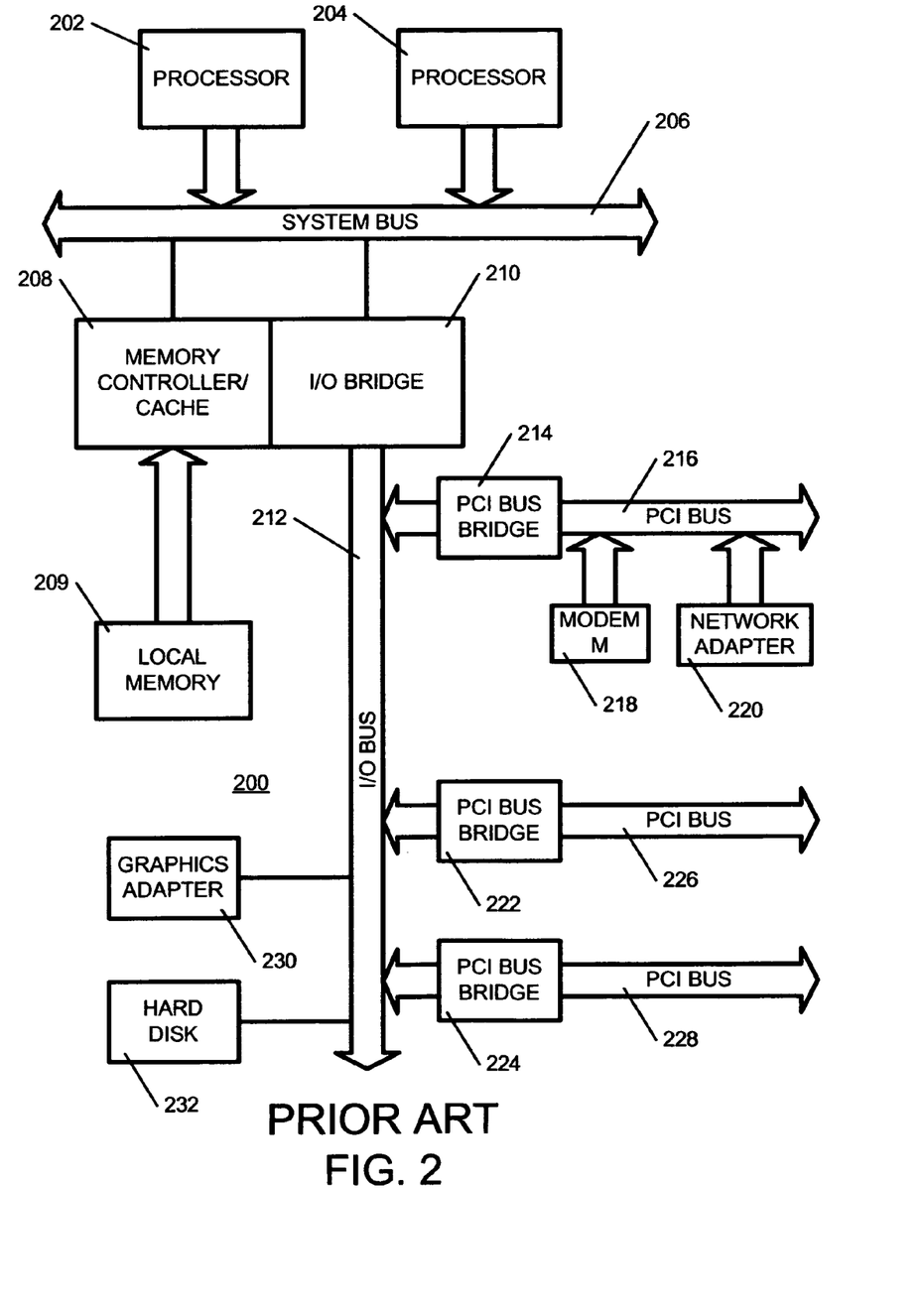
FIG. 2 is an exemplary block diagram of a server apparatus according to the present invention.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PC expansion slots or add-in connectors. Communications links to network computers 108, 110 and 112 in FIG. 1 may be provided through modem 218 and network adapter 220 connected to PCI local bus 216 through add-in boards. Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM e-Server pSeries system, a product of International Business Machines Corporation in Armonk, New York, running the Advanced Interactive Executive (AIX) operating system or LINUX operating system.

Figure 3:
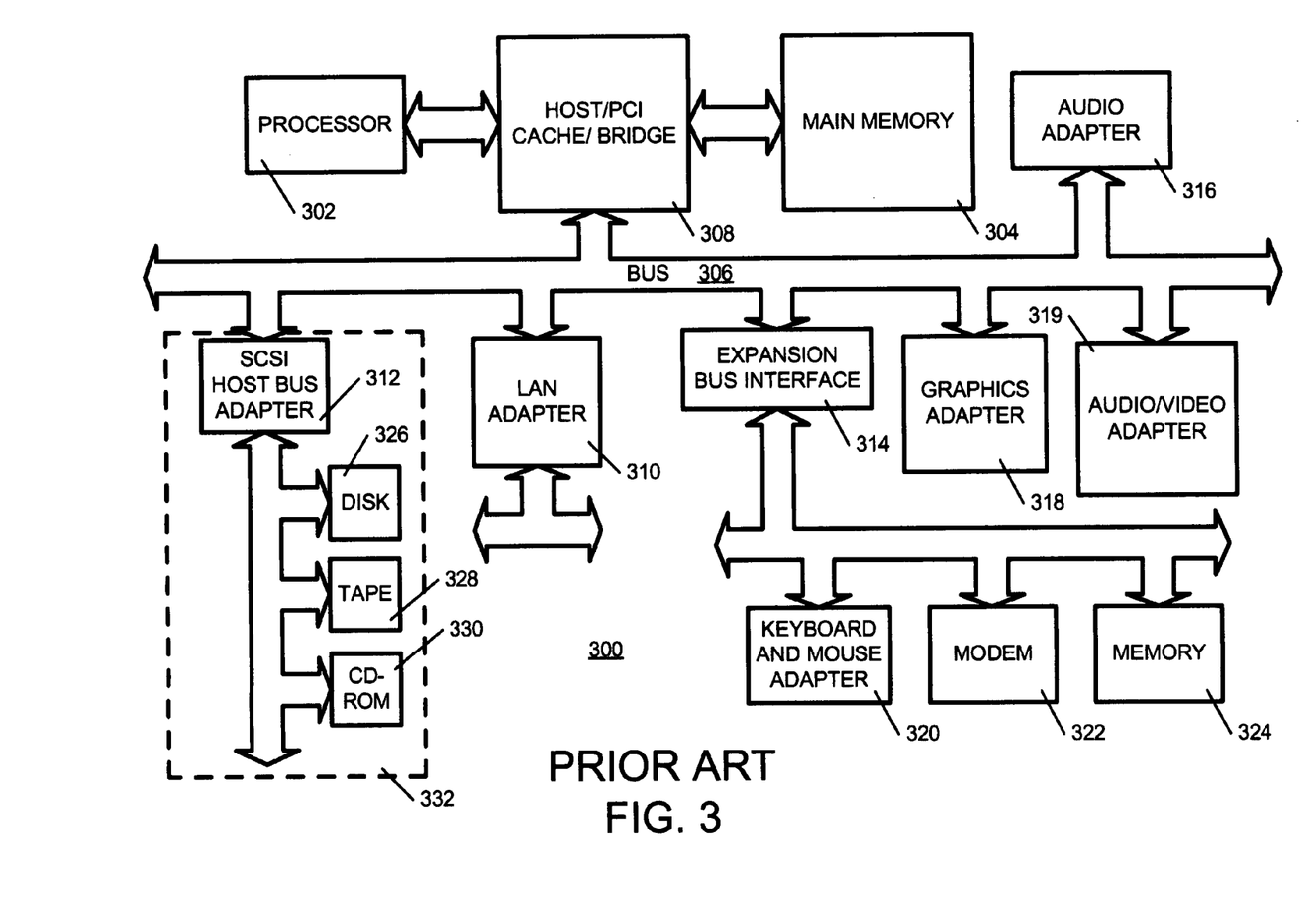
FIG. 3 is an exemplary block diagram of a client apparatus according to the present invention.

With reference now to FIG. 3, a block diagram illustrating a data processing system is depicted in which the present invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. Small computer system interface (SCSI) host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows 2000, which is available from Microsoft Corporation. An object oriented programming system such as Java may run in conjunction with the operating system and provide calls to the operating system from Java programs or applications executing on data processing system 300. "Java" is a trademark of Sun Microsystems, Inc. Instructions for the operating system, the object-oriented operating system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash ROM (or equivalent nonvolatile memory) or optical disk drives and the like, may be used in addition to or in place of the hardware depicted in FIG. 3. Also, the processes of the present invention may be applied to a multiprocessor data processing system.

As another example, data processing system 300 may be a stand-alone system configured to be bootable without relying on some type of network communication interface, whether or not data processing system 300 comprises some type of network communication interface. As a further example, data processing system 300 may be a Personal Digital Assistant (PDA) device, which is configured with ROM and/or flash ROM in order to provide non-volatile memory for storing operating system files and/or user-generated data.

The depicted example in FIG. 3 and above-described examples are not meant to imply architectural limitations. For example, data processing system 300 may also be a notebook computer or hand held computer in addition to taking the form of a PDA. Data processing system 300 also may be a kiosk or a Web appliance.

The present invention provides an apparatus and method of allowing a plurality of processors in a multiprocessor system to transmit network data in parallel. The invention may be local to client systems 108, 110 and 112 of FIG. 1 or to the server 104 or to both the server 104 and clients 108, 110 and 112. Consequently, the present invention may reside on any data storage medium (i.e., floppy disk, compact disk, hard disk, ROM, RAM, etc.) used by a computer system.

The catchphrase used to describe Ethernet is CSMA/CD. CSMA/CD is short for Carrier Sense Multiple Access/Collision Detection and is a set of rules used to determine how network devices respond when two devices attempt to use a data channel simultaneously (i.e., when a collision occurs). This standard enables devices to detect collisions. After detecting a collision, a device waits a certain amount of time before attempting to retransmit the message. If upon retransmission the device detects another collision, it waits twice as long before trying to retransmit the message. This is known as exponential back off. Thus, CSMA/CD is a type of contention resolution protocol.

Figure 4:
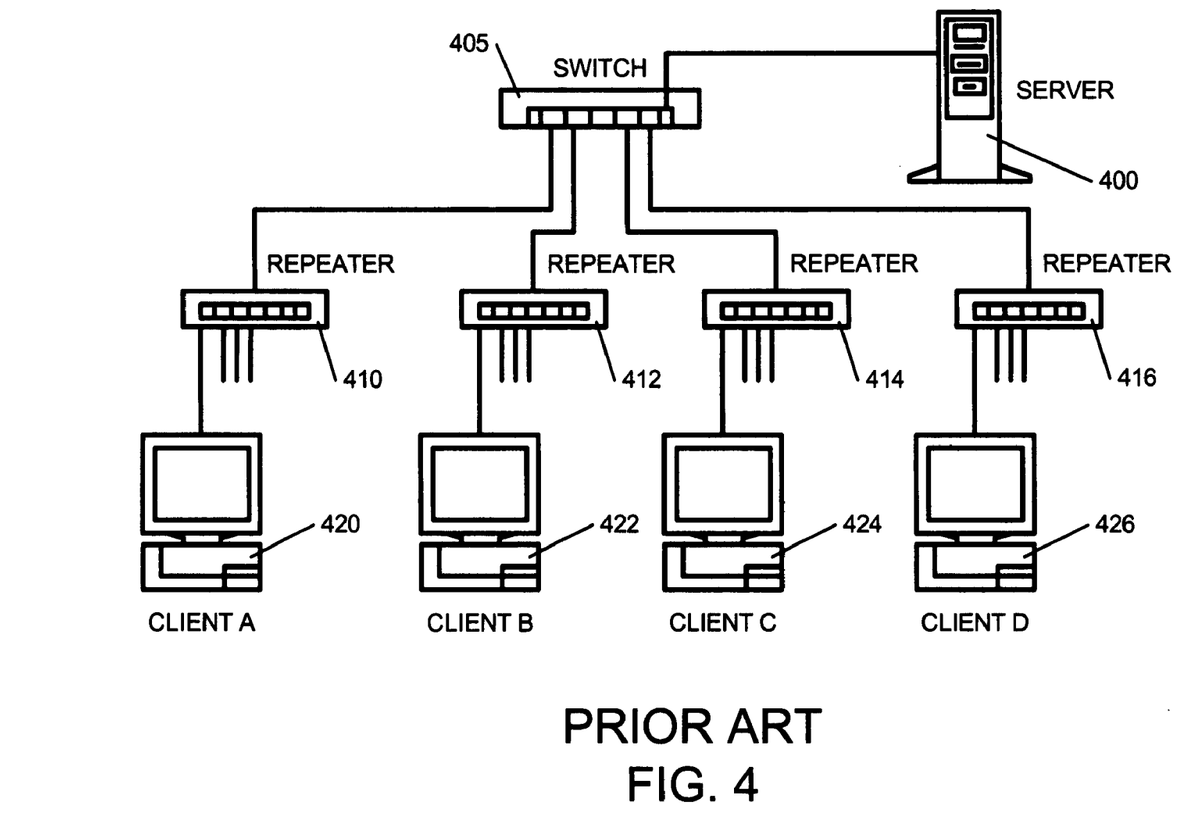
FIG. 4 illustrates a representative local area network (LAN) configuration.

In any event, most LANs are configured as shown in FIG. 4. In FIG. 4 are depicted a server connected to a plurality of client stations 420-426 through an Ethernet switch 405. Repeaters 410-416 may be used between the client stations 420-426 and the Ethernet switch 405. The repeaters are used for fault isolation and for providing a more organized methodology for expanding the LAN. Thus, based on FIG. 4, a total of four client stations may be connected to each repeater.

Each repeater is connected to a channel of the Ethernet switch 405. These channels are aggregated into one channel or Etherchannel and the Etherchannel is connected to the server 400. Hence, the Etherchannel may be viewed as being associated with the server's physical interface. Thus, the server 400 sees a single physical interface. This configuration allows the server to use one Internet Protocol (IP) address when transacting data over the network.

Etherchannel has led to a significant improvement in performance when driven by a fast SMP (Symmetric MultiProcessing). SMP is a computer architecture that provides fast performance by making multiple CPUs available to complete individual processes simultaneously (multiprocessing). Unlike asymmetrical processing, any idle processor can be assigned any task, and additional CPUs can be added to improve performance and handle increased loads. A variety of specialized operating systems and hardware arrangements are available to support SMP. Specific applications can benefit from SMP if the code allows for multithreading. Multithreading is the ability of a system to execute different parts of a program (i.e., threads) simultaneously.

As mentioned before, the single point of aggregation (i.e., the physical interface) may well become a bottleneck during high processing activity and thus may circumvent the increase in performance of SMP systems. The present invention uses virtual interfaces to alleviate this problem.

Each process and/or thread may use one of a plurality of virtual interfaces including its associated queues and routes to improve performance. The virtual interfaces may be regarded as first-in, first-out (FIFO) buffers into which data being transacted may be stored. Note that although in this example FIFO buffers are used, the invention is not restricted to only those buffers. Any other types of buffers may be used. In addition, note that the word buffer is used to indicate a location in memory or in any other (storage) devices that may be used to store data. Hence, the invention is not restricted to buffers as conventionally known.

Figure 5:
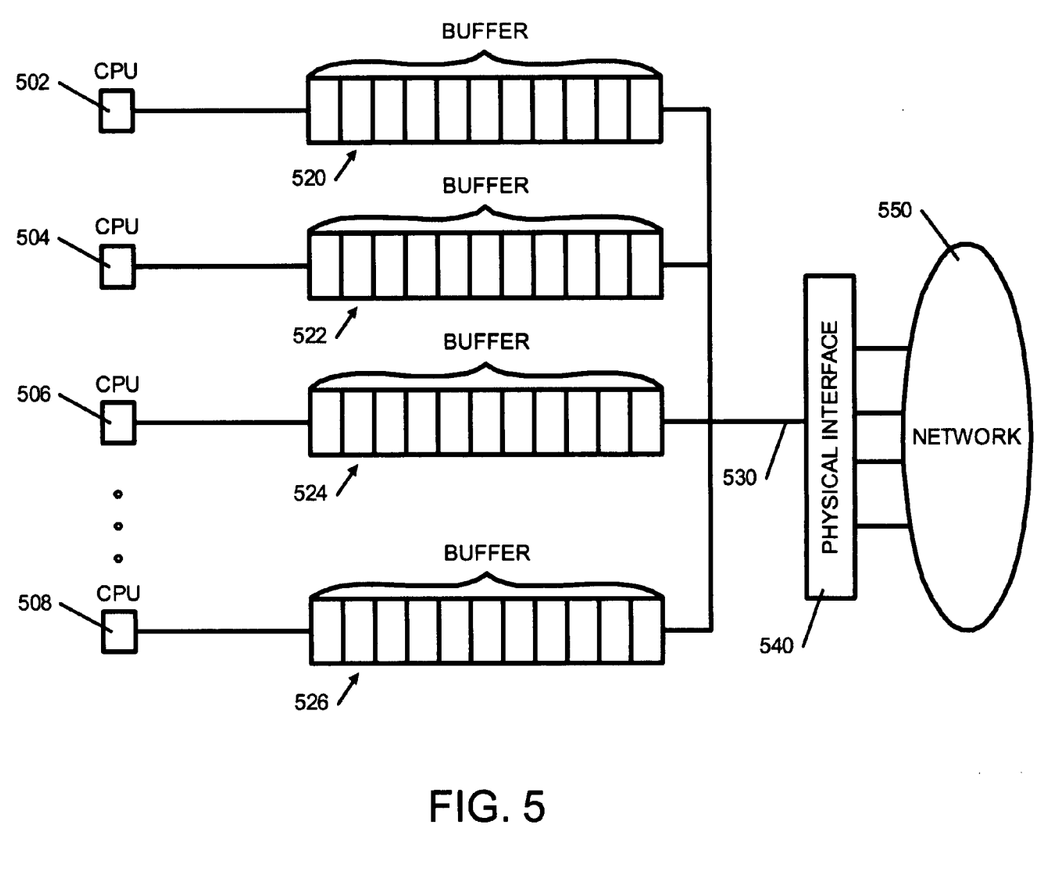
FIG. 5 depicts a perspective view of a plurality of FIFO buffers in relation to a plurality of processors and a physical interface.

FIG. 5 presents a perspective view of the FIFO buffers in relation to the processors and the physical interface. Each one of processors 502-508 uses one of buffers 520-526 into which network data is stored. The buffers are connected to physical interface 540 through Etherchannel 530. Each buffer may be identified by an IP address (i.e., a virtual IP address). Note that the processors need not be statically connected to the buffers. For example, each time a processor needs to transmit data onto the network, the processors may look into a table in order to find a buffer that is not presently in use. The virtual IP address associated with the buffer is then used as the destination IP address in the TCP/IP protocol to transfer the data into the buffer. The processor then may enter the true destination IP address into the table. Each buffer, with the help of a controller, then contends for Etherchannel 530 in order to pass its stored data onto network 550. Here, any one of available contention resolution algorithms may be used. Before passing the data (or packet of data) to the Etherchannel 530, the virtual IP address may be replaced with the destination IP address. Note that, depending on the implementation, incoming network data may or may not go through the buffer. For performance purposes, the incoming network data preferentially does not go through the buffer.

Figure 6:
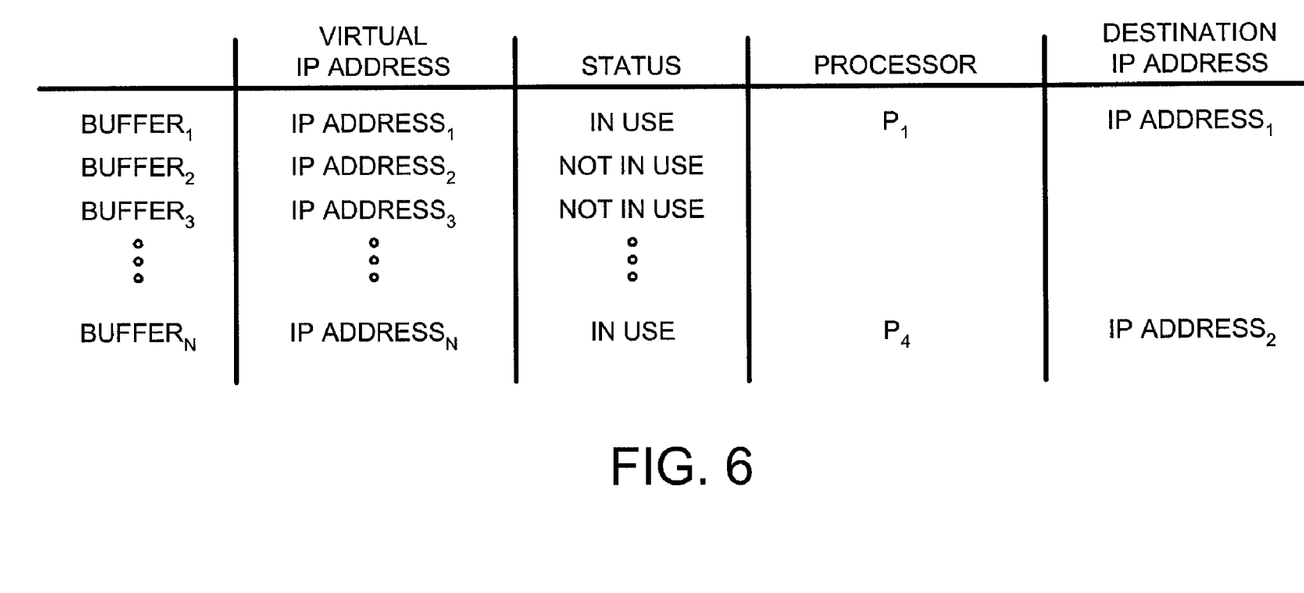
FIG. 6 is a table listing all available buffers, their status (i.e., whether in use or not), their virtual IP address and which processor is using which buffer.

FIG. 6 is a table listing all available buffers, their status (i.e., whether in use or not), their virtual IP address and which processor is using which buffer as well as the destination IP addresses. In accordance with FIG. 6, $buffer_2$ and $buffer_3$ are available for use whereas $buffer_1$ and $buffer_N$ are not as $processor_1$ is using $Buffer_1$ and $processor_4$ is using $buffer_N$, N being an integer. Note that one processor may use more than one buffer at a time if it has more than one network session in progress.

Alternatively, each time a network session is opened, the processor handling the session may requisition some memory space to be used as a buffer by using a virtual IP address. The virtual IP address will then be associated with the created memory space or buffer until the session is closed. The buffer, its virtual IP address, its status, the destination IP address and the processor using the buffer may then be entered into FIG. 6. Again a controller may be used to arbitrate the use of the Etherchannel 530 among the plurality of the created buffers. After the session is closed, the memory space may be released and the virtual IP address may be made available for other processors to use if there is a limited number of virtual IP addresses.

Figure 7:
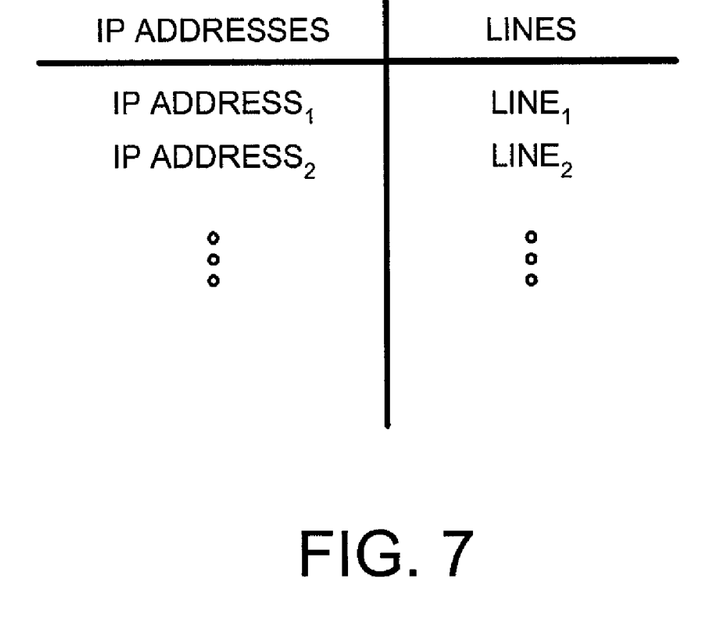
FIG. 7 depicts a table mapping the IP address of each client to a particular line of an Ethernet switch.

In certain instances (especially when the computer system is connected to the Internet), a user may want to specify a particular line from the Ethernet switch 405 of FIG. 4 to be used to transmit a piece of data. For example, a user may want a line of the switch 405 to be used whenever data destined for client system x is being transmitted. In this case, a table mapping the IP address of client x to a particular line may be stored in the switch 405. FIG. 7 illustrates such a table.

In FIG. 7, IP $address_1$ corresponds to $line_1$, IP $address_2$ to $line_2$ etc. Thus, whenever a destination IP address of a piece of data is IP $address_1$, $line_1$, will be used to transfer the data. Note that a particular data transmission policy is described here. However, the invention is not restricted to only this described policy. Any one of a variety of policies may be used alone or in combination with each other. For instance, a priority policy may be used in conjunction with the above-described policy. That is, data with a destination IP $address_1$ may be qualified as a high priority data and thus should be transferred not only on $line_1$ but also before data destined to any other client systems. Note also that $line_1$ of the Ethernet switch 405 refers to the line connected to repeater 410, $line_2$ is the line connected to repeater 412 etc. (see FIG. 4).

The invention may also be used in loopback processing. Loopback processing is used to allow Internet protocol (IP) software to be tested without worrying about broken or corrupted drivers or hardware. Loopback processing uses a special IP address (e.g., 127.0.0.1) designated for the software loopback interface of a system. The loopback interface has no associated hardware and it is not physically connected to the network.

Since a single IP address is used for loopback processing, it may become a bottleneck when the number of loopback processing sessions increases in a multiprocessor system. This is often manifested in the form of hot locks for the loopback interface queue and the route associated with the loopback interface. Just as explained before, each processor in the midst of a loopback processing may requisition some memory space to hold the data of the loopback processing. The controller may then resolve contention for the loopback interface. Note that although the loopback processing data does not enter the network, it is nonetheless understood to be network data.

Figure 8:
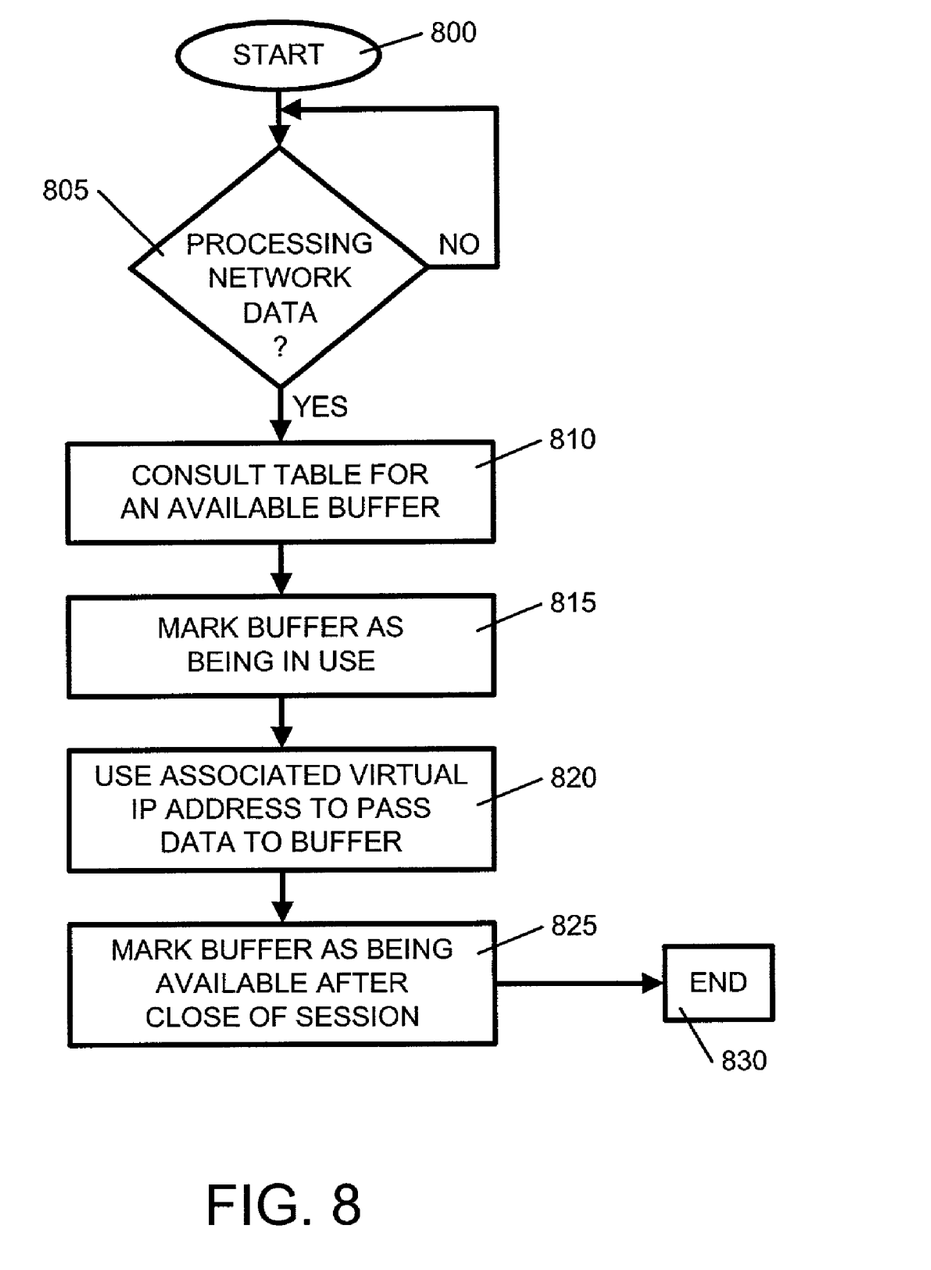
FIG. 8 is a flow chart of a first process that may be used with the present invention.

FIG. 8 is a flow chart of a first process that may be used with the invention. The process starts each time a processor is processing data (step 800). A check is continuously being made to determine whether the data being processed is network data. If so, the processor consults a table to choose an available buffer. The buffer is then marked as being in use and an associated virtual IP address is used to pass the network data to the buffer. When the network session is closed, the buffer is marked as being available for use and the process ends (steps 805-830).

Figure 9:
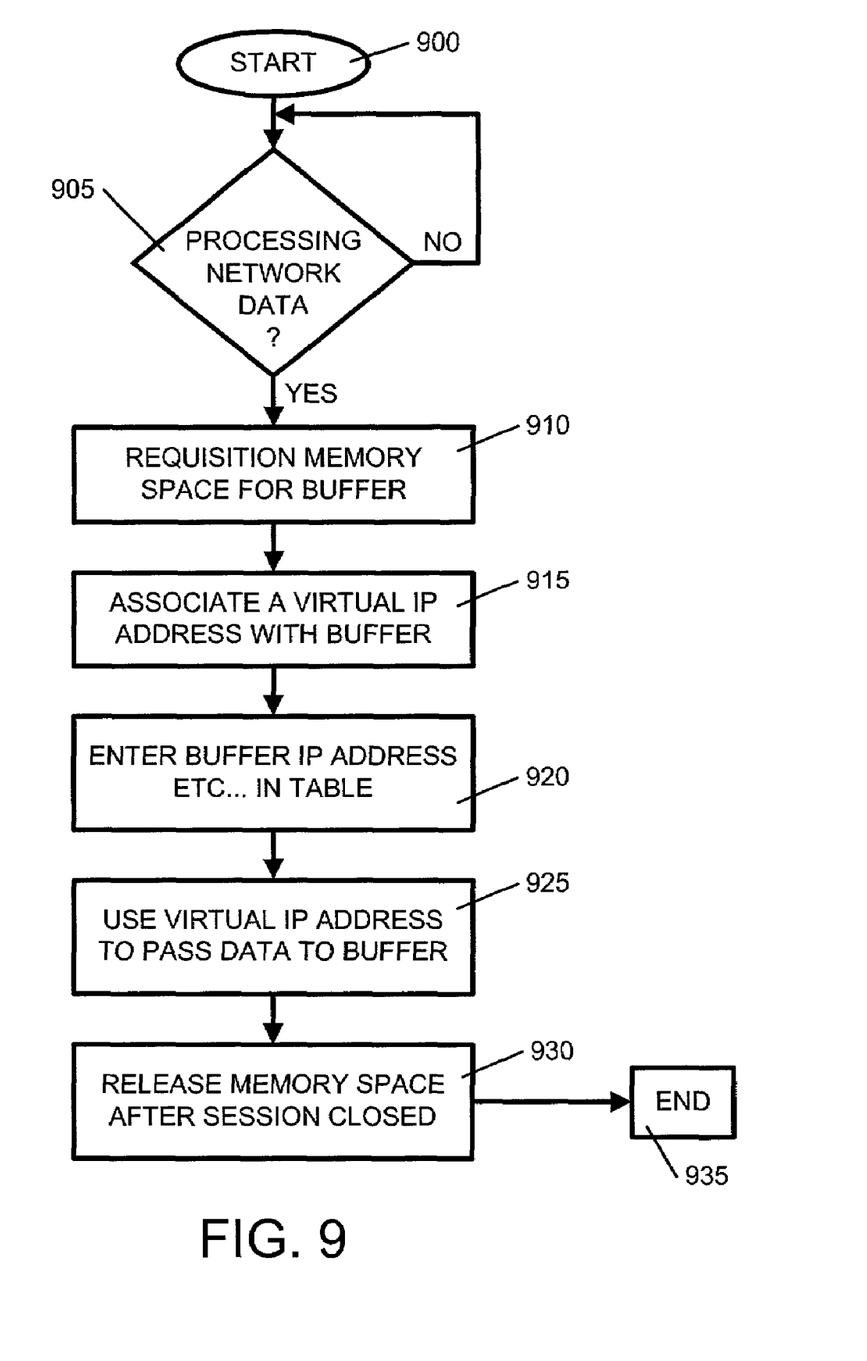
FIG. 9 is a flow chart of a second process that may be used with the present invention.

FIG. 9 is a flow chart of a second process that may be used with the invention. The process starts each time a processor is processing data (step 900). A check is continuously being made to determine whether the data being processed is network data. If so, the processor requisitions some memory space to use as a buffer and associates a virtual IP address with the buffer. Then, the processor enters all this information into a table. The virtual address is then used to pass the data into the buffer. When the network session is ended, the memory space is released and the table is updated accordingly and the process ends (steps 905-935).

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method of improving performance in a multiprocessor system in which a processor has to contend with other processors for a limited number of physical interfaces to transmit data to a network comprising:

determining whether data being processed is to be transmitted from the processor of the multiprocessor system to the network;

associating a virtual Internet protocol (IP) address with a memory device in response to determining that the data being processed is to be transmitted from the processor of the multiprocessor system to the network; and transmitting the data from the processor of the multiprocessor system using the virtual IP address associated with the memory device as a destination IP address enabling the data to be transmitted from the processor of the multiprocessor system to the memory device, wherein the memory device contends. using a controller, for one of the limited number of physical interfaces to transmit the data to the network.

2. The method of claim 1 wherein the memory device is a buffer.

3. The method of claim 2 wherein the buffer is implemented using memory allocation.

4. The method of claim 2 wherein the buffer is a dedicated memory allocation.

5. The method of claim 4 wherein before transmitting the data to the physical interface, the virtual IP address is replaced by a destination IP address.

6. A computer program product on a computer readable medium for improving performance of a multiprocessor system in which a processor has to contend with other processors for a limited number of physical interfaces to transmit data to a network comprising:

code means for determining whether data being processed is to be transmitted from the processor of the multiprocessor system to the network;

code means for associating a virtual Internet protocol (IP) address with a memory device in response to determining that the data being processed is to be transmitted from the processor of the multiprocessor system to the network: and code means for transmitting the data from the processor of the multiprocessor system using the virtual IP address associated with the memory device as a destination IP address enabling the data to be transmitted from the processor of the multiprocessor system to the memory device, wherein the memory device contends. using a controller, for one of the limited number of physical interfaces to transmit the data to the network.

7. The computer program product of claim 6 wherein the memory device is a buffer.

8. The computer program product of claim 7 wherein the buffer is implemented using memory allocation.

9. The computer program product of claim 7 wherein the buffer is a dedicated memory allocation.

10. The computer program product of claim 9 wherein before transmitting the data to the physical interface, the virtual IP address is replaced by a destination IP address.

11. An apparatus for improving performance of a multiprocessor system in which a processor has to contend with other processors for a limited number of physical interfaces to transmit data to a network comprising:

means for determining whether data being processed is to be transmitted from the processor of the multiprocessor system to the network;

means for associating a virtual Internet protocol (IP) address with a memory device in response to determining that the data being processed is to be transmitted from the processor of the multiprocessor system to the network; and means for transmitting the data from the processor of the multiprocessor system using the virtual IP address associated with the memory device as a destination IP address enabling the data to be transmitted from the processor of the multiprocessor system to the memory device, wherein the memory device contends, using a controller, for one of the limited number of physical interfaces to transmit the data to the network.

12. The apparatus of claim 11 wherein the memory device is a buffer.

13. The apparatus of claim 12 wherein the buffer is implemented using memory allocation.

14. The apparatus of claim 12 wherein the buffer is a dedicated memory allocation.

15. The apparatus of claim 14 wherein before transmitting the data to the physical interface, the virtual IP address is replaced by a destination IP address.

16. A multiprocessor system having means for improving performance for transmitting data to a network using a limited number of physical interfaces for which a processor has to contend with other processors for comprising:

at least one memory device to store code data; and using one of the processors for processing the code data to determine whether data being processed is to be transmitted from the processor of the multiprocessor system to the network, to associate a virtual Internet protocol (IP) address with a memory device in response to determining that the data being processed is to be transmitted from the processor of the multiprocessor system to the network, and to transmit the data from the processor of the multiprocessor system using the virtual IP address associated with the memory device as a destination IP address enabling the data to be transmitted from the processor of the multiprocessor system to the memory device, wherein the memory device contends, using a controller, for one of the limited number of physical interfaces to transmit the data to the network.

17. The multiprocessor system of claim 16 wherein the memory device is a buffer.

18. The multiprocessor system of claim 17 wherein the buffer is implemented using memory allocation.

19. The multiprocessor system of claim 17 wherein the buffer is a dedicated memory allocation.

20. The multiprocessor system of claim 19 wherein before transmitting the data to the physical interface, the virtual IP address is replaced by a destination IP address.

* * * * *